United States Patent
Soeta

(10) Patent No.: US 7,251,204 B2
(45) Date of Patent: Jul. 31, 2007

(54) OPTICAL DISC REPRODUCING APPARATUS

(75) Inventor: Shuichi Soeta, Fukushima (JP)

(73) Assignee: D & M Holdings Inc., Kanagawa (JP)

( * ) Notice: Subject to any disclaimer, the term of this patent is extended or adjusted under 35 U.S.C. 154(b) by 519 days.

(21) Appl. No.: 10/797,061

(22) Filed: Mar. 11, 2004

(65) Prior Publication Data
US 2005/0063267 A1    Mar. 24, 2005

(30) Foreign Application Priority Data
Sep. 24, 2003    (JP) .............................. 2003-332232

(51) Int. Cl.
*G11B 7/00*    (2006.01)
(52) U.S. Cl. ................................ 369/47.23
(58) Field of Classification Search ............ 369/44.26, 369/44.27, 44.28, 30.23, 47.1, 47.27
See application file for complete search history.

(56) References Cited

U.S. PATENT DOCUMENTS

| 5,614,687 A | 3/1997 | Yamada et al. |
| 6,590,840 B2 | 7/2003 | Inoue et al. |
| 6,804,179 B2 * | 10/2004 | Miyashita et al. ....... 369/30.23 |
| 7,080,016 B2 * | 7/2006 | Miyashita et al. .......... 704/278 |
| 2003/0065517 A1 | 4/2003 | Miyashita et al. |

FOREIGN PATENT DOCUMENTS

| GB | 2 365 616 A | 2/2002 |
| JP | 8-201542 | 8/1996 |
| JP | 2000-251411 | 9/2000 |
| JP | 2001-312857 | 11/2001 |

* cited by examiner

*Primary Examiner*—Nabil Hindi
(74) *Attorney, Agent, or Firm*—Dickstein Shapiro LLP

(57) ABSTRACT

According to the optical disc reproducing apparatus relating to the present invention, DSP detects a beat from an audio signal from the optical disc, and in a beat search mode, every time when the jog 28 is clicked once, the microcomputer traces one by one, the beats a, b, c, d, e, f, g, h, i, j and k, having been detected, in order of g→h→i→j→k, or f→e→d→c→b→a, from the search end position according to a shuttle. In a downbeat search mode, every time when the jog 28 is clicked once, the microcomputer traces one by one the downbeats a, c, e, g, i and k, having been detected, in order of g→i→k, or e→c→a, from the search end position according to the shuttle. With such functions above, it is possible to enhance the operability of the optical disc reproducing apparatus, when a beat is searched.

6 Claims, 5 Drawing Sheets

OPTICAL DISC REPRODUCING APPARATUS

BACKGROUND

The present invention relates to an optical disc reproducing apparatus.

As an optical reproducing apparatus used in an dance hall such as a disco, so-called "club", for enjoying dancing to the music, for example, a reproducing apparatus as disclosed in the Japanese Patent Laid-open Publication No. 2000-251411, is known. This reproducing apparatus has a function as the following: A beat signal generation timing that indicates a reproducing end position on a first CD (Compact Disc), and a beat signal generation timing that indicates a reproducing start position on a second CD are respectively detected. At the timing when the reproducing point of the first CD reaches the reproducing end position, reproducing of the second CD starts from the reproducing start position. According to this reproducing apparatus, the first music can be switched to the second music so that at the timing when the beat on the reproducing end point of the first music is generated, the beat on the reproducing start point of the second music is generated. Therefore, the second music can be continuously reproduced without pause.

This kind of optical disc reproducing apparatus as described above further has a function (hereinafter referred to as a "hot start function") in which a reproduction from a position set as a start point (hereinafter referred to as "A point") is started immediately after pressing of a button. The optical disc reproducing apparatus may further have a function (hereinafter referred to as "stutter function") in which the reproduction from the A point is performed only while the button is being pressed, and a function (hereinafter referred to as "seamless loop function") in which the reproduction is performed repeatedly and seamlessly between the A point and a position set as an end point (hereinafter referred to as "B point"). A user such as a DJ (Disc Jockey) firstly sets the A point according to the following operation, so as to utilize the functions as described above.

The user firstly searches across a track of music to be reproduced with a track selector on which a rotary encoder and the like is used. Then, the user conducts a search inside of the track, for example, by use of a shuttle and the like, at appropriate intervals (for example, at one minute interval). Furthermore, by operating a jog, the user conducts a search for audio signals in units of frame, and sets a beat on a desired position as the A point.

SUMMARY OF THE INVENTION

However, when a user such as a DJ conducts a search in units of frame, the user is required to operate the jog one time for each search corresponding to one frame. For example, in one frame of CD-DA (Compact Disc-Digital Audio), there are recorded audio signals corresponding to $1/75$ seconds (13.3 msec). Therefore, if a music having the number of beats 130 BPM (Beats Per Minute: number of beats per minute) is recorded on this CD-DA, searching across 35 frames, that is, 35 times jog clicks are necessary so as to detect one beat every 461.5 msec. In one type of such reproducing apparatuses, every time when the jog is rotated once, searching across 10 frames is possible. Even with such type of reproducing apparatus, it is necessary for the user such as a DJ to rotate the jog three times and a half, so as to detect one beat out of the beats every 461.5 msec.

Generally, the DJ is required to show various performances, while being responsible for continuous reproduction of music without pause. Under such circumstances, such a need for cumbersome jog operations so as to set the A point places a burden on the DJ.

The present invention helps to enhance the operability of an optical disc reproducing apparatus, at the time of searching for a beat.

The present invention comprises, a reproducing means which reproduces from an optical disc, an audio signal and time information relating to a reproducing time for the audio signal, which are recorded on the optical disc, a beat detecting means which detects from the audio signal reproduced by the reproducing means, beats contained in a musical rhythm represented by the audio signal, a first storing means which stores the audio signal reproduced by the reproducing means, a second storing means which stores the time information reproduced by the reproducing means, with respect to each audio signal respectively corresponding to the beats being continuous, which are detected by the beat detecting means, a first operation means which receives a beat searching operation, and a control means which searches for the time information of the beats being continuous stored in the second storing means, in order of time represented by the time information, or in reverse order thereof, when the first operation means receives the beat searching operation, and reads the audio signal stored in said first storing means based on the time information thus searched.

DESCRIPTION OF THE PREFERRED EMBODIMENTS

Hereinafter, preferred embodiments of the present invention will be explained, with reference to the attached drawings.

Firstly, with reference to FIG. 1 and FIG. 2, a configuration of the optical disc reproducing apparatus relating to the present embodiment will be explained.

Figure 1:
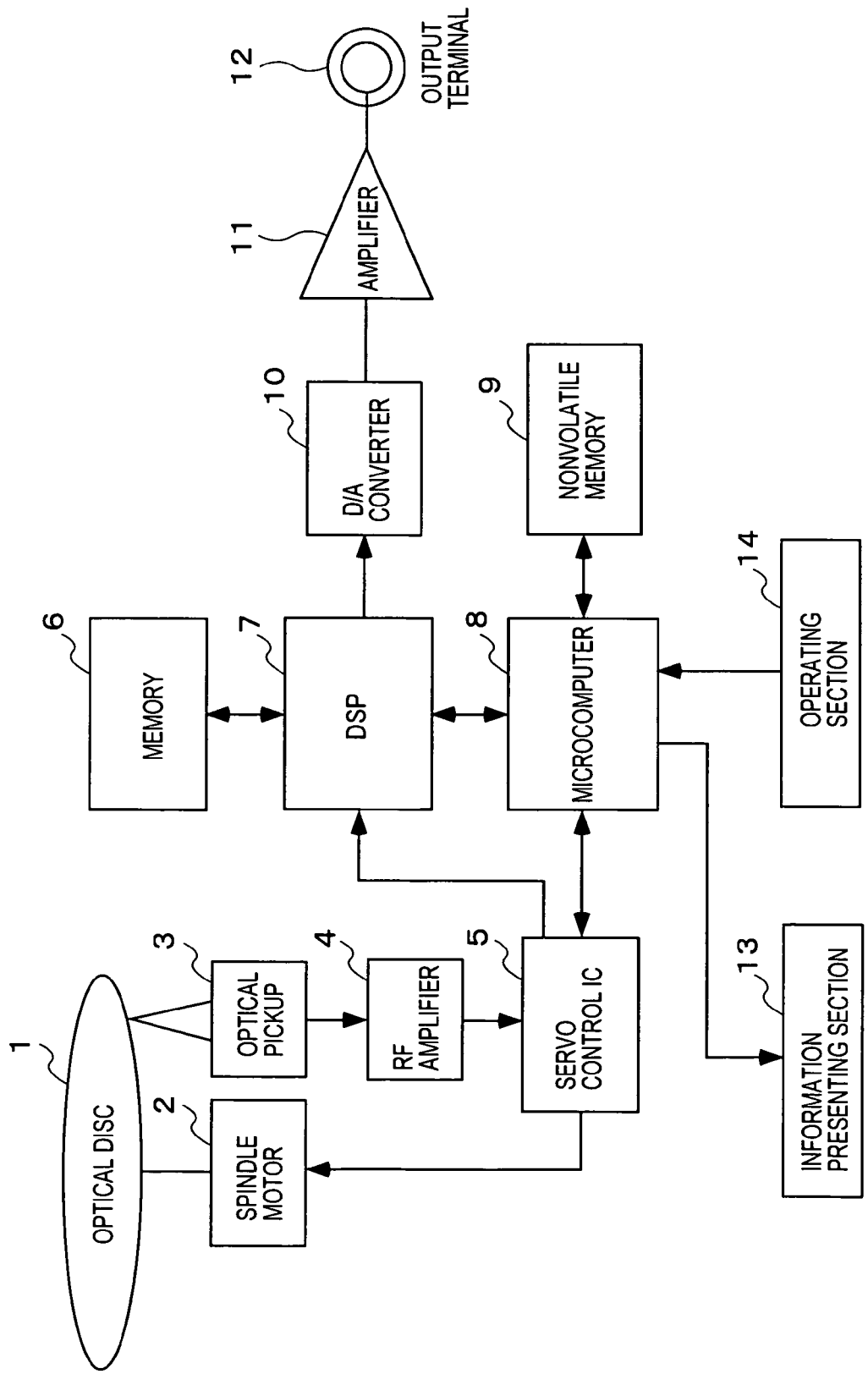
FIG. 1 is a diagram showing a configuration of an optical disc reproducing apparatus relating to one embodiments of the present invention.

As shown in FIG. 1, the optical disc reproducing apparatus relating to the present embodiment comprises, a spindle motor 2 for rotating an optical disc 1 such as CD (Compact Disc) and the like being mounted thereon, an optical pickup 3 for reproducing a recorded signal of the optical disc 1, an RF (Radio Frequency) amplifier 4 for amplifying output signal from the optical pickup 3, a servo control IC 5 for controlling the rotation of the spindle motor 2, and for decoding the output signal from the RF amplifier 4 into an audio signal by way of an internal decoding circuit, a servo control IC (not illustrated) for controlling the optical pickup 3 feeding and the like, a memory 6, a DSP (Digital Signal Processor) 7 for temporarily storing the audio signal decoded in the decoding circuit of the servo control IC 5 into memory 6 after a predetermined signal processing, and for reading the audio signal from the memory 6, a D/A (Digital Analog) converter 10 for converting the audio signal read from the memory 6 by the DSP 7, from a digital signal to an analogue signal, an amplifier 11 for amplifying the analogue signal from the D/A converter 10, an output terminal 12 for outputting the analog signal from the amplifier 11, an operating section 14 for receiving various operations from a user (for example, DJ), a microcomputer 8 for controlling the servo control IC 5 and the DSP 7 and the like in response to the operation received by the operating section 14, an information displaying section 13 for displaying various information to the user according to the instruction from the microcomputer 8, and a nonvolatile memory 9 which stores a program executed by the microcomputer 8, and setting information and the like which are read in an initialization process and the like when the power is ON.

Figure 2:
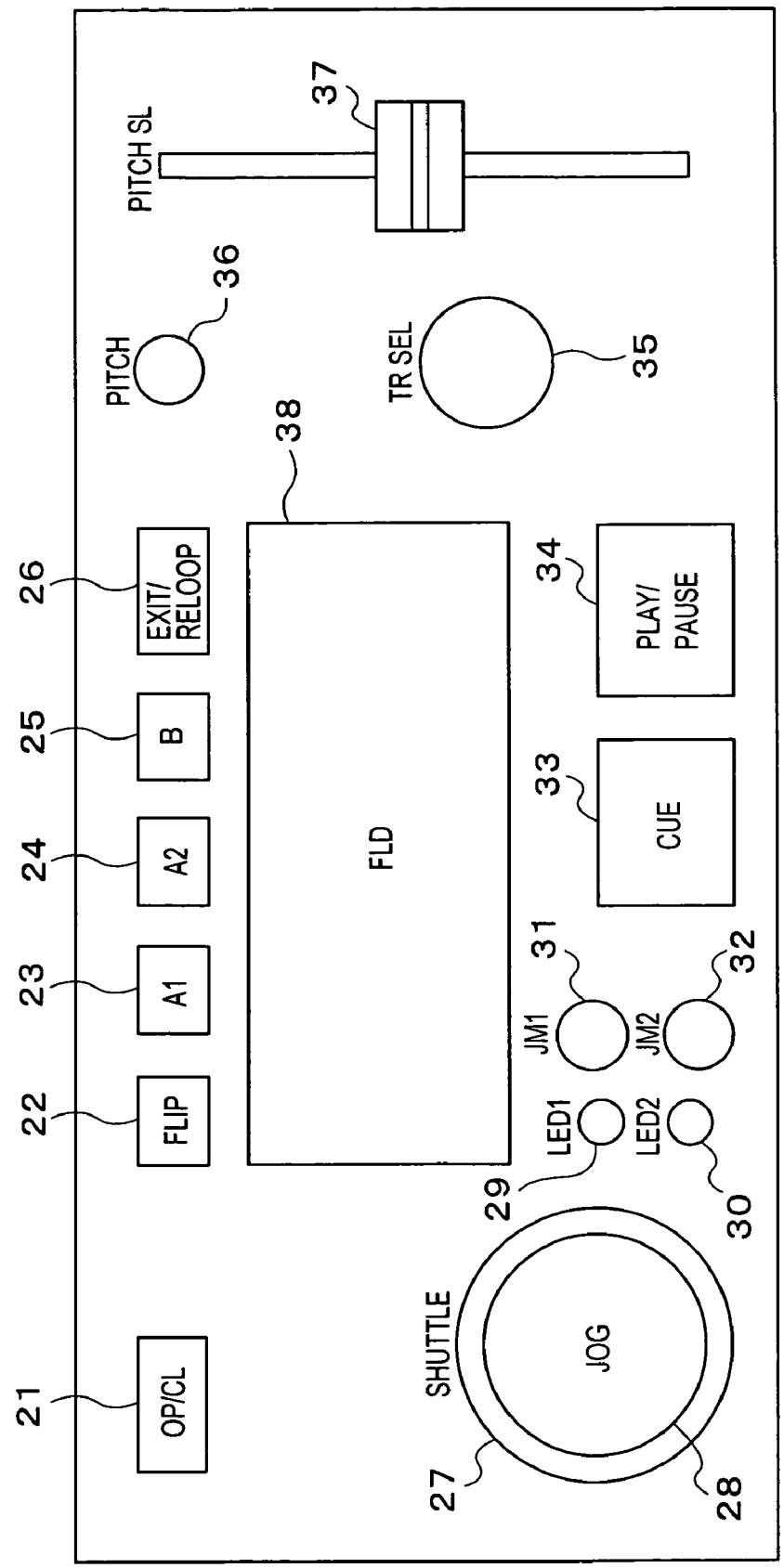
FIG. 2 is a diagram showing a layout of operating section of the optical disc reproducing apparatus relating to one embodiment of the present invention.

As shown in FIG. 2, the operating section 14 and the information displaying section 13 are arranged on the same control panel (for example, a front surface of the body of the optical disc reproducing apparatus, and the like).

The operating section 14 includes operating tools for receiving operations from a user, relating to a procedure for setting the A point and B point. Specifically, the operating section 14 includes a track selector (TR SEL) 35 using a rotary encoder and the like for searching across a track of music to be reproduced, a SHUTTLE 27 for searching for the audio signals within the track at appropriate intervals (for example, at one minute interval), a JOG 28 for searching for a beat included in rhythm of the music represented by the audio signals within the track, two buttons (JM1, JM2) 31, 32 for switching the operation mode of the jog 28 to one of a plurality of operation mode types (downbeat search mode, one-beat search mode, one-frame search mode, and the like), two A buttons 23, 24 for setting the A point, FLIP button 22 for switching the operation modes (hot start mode, stutter mode, and the like) of the A buttons 23, 24, B button 25 for setting the B point, and CUE button 33 for conducting "back-cue" function after stopping the reproduction of the music. The "back-cue" indicates returning to the A point for being prepared for a start of reproduction. The A button includes H/S (hot start) mode and STR (stutter mode), and the FLIP button 22 switches between the two modes.

Furthermore, as another operation tools, the operating section 14 includes an open/close button (OP/CL) 21 for ejecting the optical disc 1, EXIT/RELOOP button 26 for exiting from or returning to a loop which repeats the reproduction from the A point to the B point, a pitch slider (PITCH SL) 37 for changing the reproducing speed, and a PITCH button 36 for selecting a status of the pitch slider 37, active or inactive.

An initial operation mode of the jog 28 and of the A buttons 23, 24, and an initial status (active/inactive) of the pitch slider 37 are predefined by the setting information stored in the nonvolatile memory 9. For example, the operation mode of the jog 28 is BEND mode, in which reproducing speed by rotation of the jog 28 is adjustable, when a normal readout/reproduction from the optical disc 1 is performed. On the other hand, in a status that the reproducing position is returned to the A point by pressing the CUE button 33, or in a pause state, the operation mode of the jog 28 is set to a predefined mode, which is any one of the one-frame search mode, one-beat search mode and downbeat search mode. As described above, in the setting information within the nonvolatile memory 9, there are stored data on such initialization as to the operation mode of the jog 28, those data on initialization being appropriate to the operational status of the optical disc reproducing apparatus. This setting information is rewritten by the microcomputer 8, when the user changes the settings in the preset mode and the like.

The information displaying section 13 contains LFD (Fluorescent Display) 38 for displaying various information, and two LEDs (Light Emitting Diodes) (LED1, LED2) 29, 30 for indicating the current operation mode of the jog 28.

Next, functional elements implemented through execution of a program by the DSP 7 and the microcomputer 8, and a storage area of the memory 6 will be explained.

In this optical disc reproducing apparatus, the DSP 7 controls storing of audio signals into the memory 6 and reading the audio signals from the memory 6, and further, it detects a beat which is generated periodically by a particular musical instrument (for example, such as a percussion which constantly generates approximately same frequency components). In order to execute this processing, the DSP 7 includes a beat detecting section which detects a generation timing of the beat included in the components within a predetermined frequency band of the audio signal, which is decoded in the decoding circuit in the servo control IC 5, and a detected signal processing section which allows the memory 6 to store the information (address information) regarding the beat generated at the timing which has been detected by the beat detecting section. Here, as the frequency band where the beat detecting section detects the beat, it may be possible to select a band with the lowest frequency (hereinafter referred to as "low frequency band), for example, among a plurality of bands, which are obtained by dividing the frequency component of the audio signal into a plurality of bands (for example dividing into three).

The beat detecting section includes, (1) a digital filter (BPF: band path filter) for extracting the low frequency band component of the audio signal which is decoded in the decoding circuit within the servo control IC 5, (2) a switch for switching the output direction of the signal extracted in the BPF between two contact points, (3) a peak data hold circuit for detecting a maximum value of the signal level of the output (a signal extracted in the BPF) from one of the contact points of the switch, (4) a first slice level generating circuit which outputs as a first slice level signal, the signal indicating for example 88% of the maximum value which has been detected in the peak data hold circuit, (5) a second slice level generating circuit which outputs as a second slice level signal, the signal indicating for example 75% of the maximum value which has been detected in the peak data hold circuit, (6) a signal slice pulse converter which compares the signal level of the output from the other contact point of the switch (the signal extracted in the BPF), with the slice level signals from the first and the second slice level generating circuits, when the switch output goes over the first slice level signal, outputs a first signal (a signal announcing a generation of downbeat) to the detected signal processing section, and alternatively when the switch output goes over the second slice level signal, outputs a second signal (a signal announcing a generation of beat other than the downbeat) to the detected signal processing section, and (7) a timer which changes the switch to the contact point in the peak data hold circuit side, when the signal slice pulse converter outputs either one of the first and the second signals, and after a lapse of predetermined period of time, which changes the switch to the contact point in the signal slice pulse converter side. With the configuration as described above, the beat detecting section can notify the detected signal processing section of the generation timing as to a downbeat and the generation timing of a beat other than the downbeat.

When the detected signal processing section receives an input of either one of the first signal and the second signal from the beat detecting section, the detected signal processing section extracts from the sub-code data of the audio signal corresponding to the detected beat, out of the sub-code data read out from the optical disc 1, time information (information representing a reproducing time of the audio signal, relative to the reproducing time from the track head). Then, the detected signal processing section stores the time information in the memory 6 as address information indicating a position where the beat thus detected is generated. However, if an input signal from the beat detecting section is the first signal, the detected signal processing section stores in the memory 6 identification information indicating that the detected beat is a downbeat, together with the address information.

As thus described, since the address information and the like of the detected beat, in addition to the audio signal from the servo IC 5 are stored according to the control by DSP 7, the storage area of the memory 6 includes a first region which is used to store audio signals of predetermined volume, and a second region which is used to store address information (in the case where the detected beat is downbeat, address information and the identification information) of the beat detected within a predetermined time period including the current reproducing position (a reproducing time of the audio signal read out from the memory 6). For example, when the audio signals corresponding to 30 seconds are stored in the first region, according to the detected signal processing section of the DSP 7, the second region stores the address information (in the case where the detected beat is downbeat, address information and the identification information) of the beat which is detected with respect to the audio signals of 30 seconds already read out from the first region, and the address information (in the case where the detected beat is downbeat, address information and the identification information) of the beat which is detected with respect to the audio signals now stored in the first region.

The microcomputer 8 includes an operation mode changing section which changes the operation mode of the jog 28, or the A buttons 23, 24, in response to the operation received by the predefined operation tools (JM1 button 31, JM2 button 32, and FLIP button 22) on the operating section 14, and a control section which executes a control processing in response to the operation received by the other tools on the operating section 14. The control processing executed by the control section includes a beat search processing, a downbeat search processing and a frame search processing.

Figure 3:
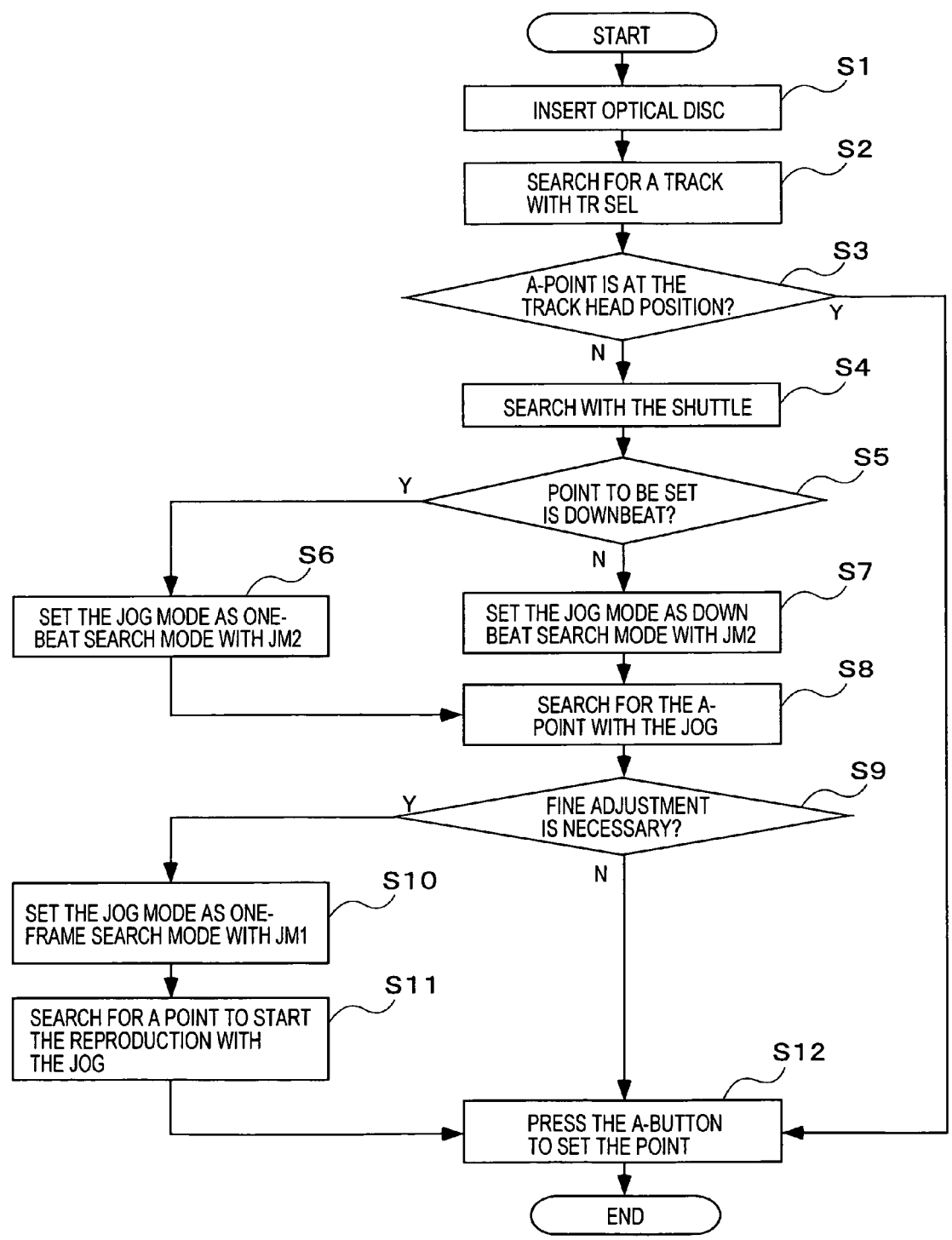
FIG. 3 is a flowchart showing an operational procedure of a user, when a beat is searched in the optical disc reproducing apparatus relating to one embodiment of the present invention.

Next, according to the operational procedures by the user as shown in FIG. 3, the beat search processing, the downbeat search processing and the frame search processing executed by the control section of the microcomputer 8 will be explained.

In S1, when the user inserts an optical disc 1 into the drive of the optical disc reproducing apparatus, the microcomputer 8 controls the DSP 7 and the like to read TOC (Table of Contents) from the optical disc 1. When the microcomputer 8 completes reading the TOC, the microcomputer 8 controls the DSP 7 and the like to read the audio signals from the optical disc 1 at the ratio of 1 or more, and stores audio signals thus read into the memory 6. At this timing, in the DSP 7, the beat detecting section detects a generation timing of the beat included in the musical rhythm represented by the audio signals, and the detected signal processing section stores in the memory 6, the address information (in the case where the detected beat is a downbeat, address information and the identification information), indicating a position of the beat thus detected.

When the user determines that the A point is not in the first music piece, he or she operates the track selector 35 and conducts a track search in S2. When the operation of the track selector 35 is started, the DSP 7 erases the audio signal and the address information from the memory 6, according to the control by the microcomputer 8. When the operation of the track selector 35 is completed (i.e., the user completes the track search), the DSP 7 stores a reproduced audio signal into the memory 6 and performs the beat detecting processing, according to the control by the microcomputer 8, as in the case with S1.

Subsequently, in S3, the user checks whether or not the A point is to be set on the head position of the track thus searched. As a result, if it is preferable to set the A point on the head position of the track thus searched, the user presses the A button (23 or 24) in S12. Accordingly, the microcomputer 8 stores as the A point, the address information of the head position of the track thus searched, into the built-in memory of the microcomputer 8.

On the other hand, if it is not preferable to set the A point on the head position of the track thus searched, the user operates the shuttle 27 and searches for the audio signals within the track, in S4, for example at one minute interval. When the operation of the shuttle 27 is started, the DSP 7 erases the audio signal and the address information from the memory 6, according to the control by the microcomputer 8. When the operation of the shuttle 27 is completed, the DSP 7 stores into the memory 6 the audio signals between 15 seconds before the search end position and 15 seconds after the same point, and performs the beat detecting processing for detecting the beats from those audio signals.

Here (S5), it is determined which is to be a candidate for setting the A point, either a downbeat or a beat not limited to the downbeat.

As a result, if it is determined that the downbeat is a candidate for setting the A point, it is necessary for the user to press the JM2 button 32 to render the JM2 button 32 ON status in S6. Accordingly, the operation mode of the jog 28 becomes the downbeat search mode. At this timing, the microcomputer 8 allows, for example, the LED1 to light off and the LED2 to light up, with respect to the two LEDs (LED1, LED2) 29, 30, and simultaneously, controls the DSP 7 to read from the memory 6 the address information (downbeat address information) being associated with the identification information.

On the other hand, if it is determined that a beat not limited to the downbeat is a candidate for setting the A point, it is necessary for the user in S7, to press the JM2 button 32 to render the JM2 button 32 OFF status. Accordingly, the operation mode of he jog 28 becomes one-beat search mode. At this timing, the microcomputer 8 allows only one of two LEDs (LED1, LED2) 29, 30 to go on and off, for example only LED 2 in this case, and controls the DSP 7 to read all the address information (address information of the downbeats and the beats other than the downbeat) from the memory 6.

As thus described, when setting of the operation mode of the jog 28 is completed, subsequently (i.e., in S8), the user can search for a beat as the A point, by operating the jog 28 as the following.

If the operation mode of the jog 28 is a downbeat search mode, ever time when the user clicks the jog 28 once, by rotating the jog 28 in clockwise, it is possible to search for a downbeat one by one, which has been detected from the audio signals included in 15 seconds ahead of the search end position according to the shuttle 27. Specifically, the microcomputer 8 executes the following downbeat searching processing.

Figure 4A:
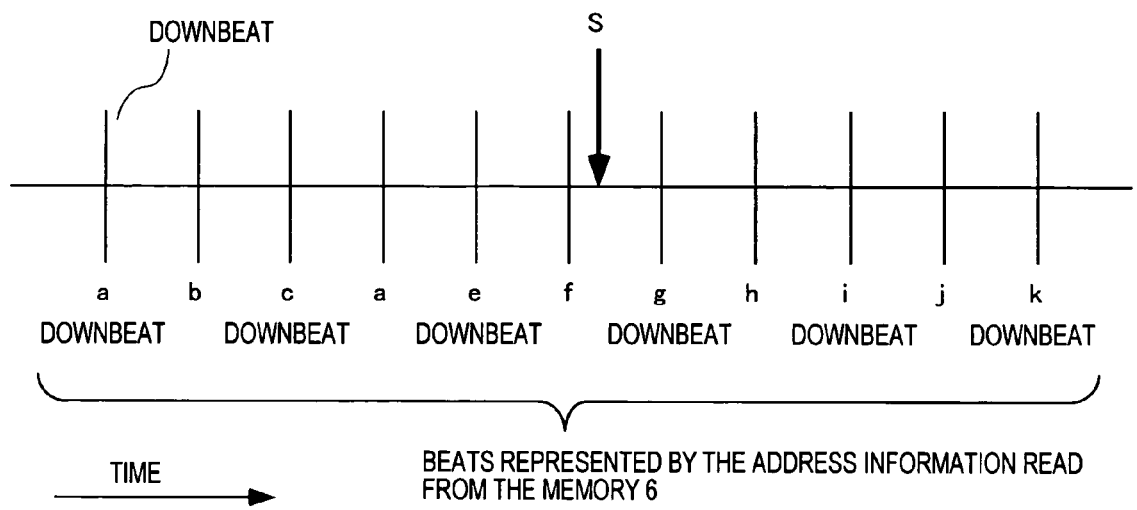
FIG. 4A is a diagram for explaining a beat search in a beat search mode.
Figure 4B:
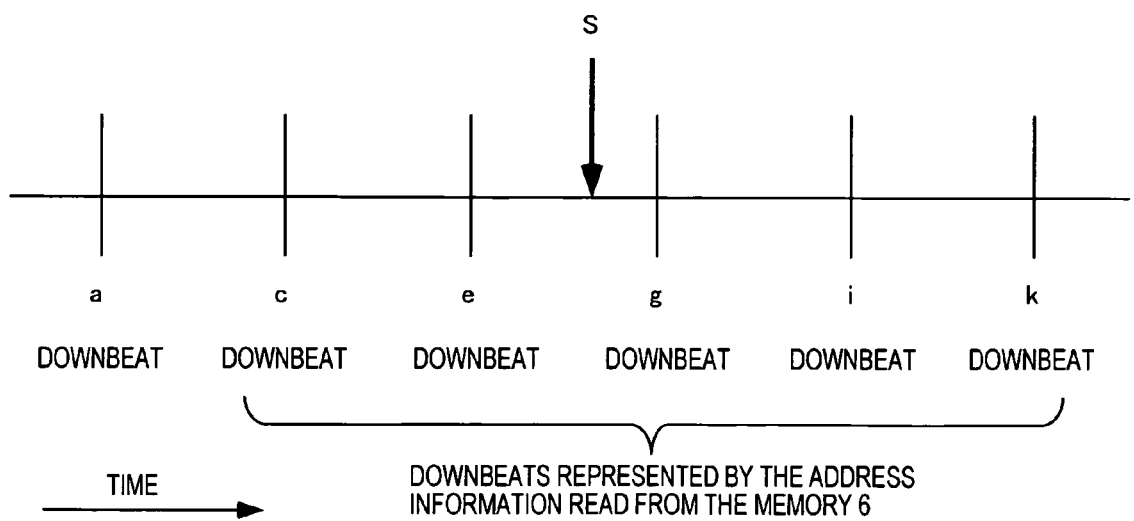
FIG. 4B is a diagram for explaining a downbeat search in one downbeat search mode.

As shown in FIG. 4B, when the jog 28 is rotated in clockwise causing one click, the microcomputer 8 holds the address information g as the A point address information, which is the closest to the search end position S according to the shuttle 27, out of the address information g, i and k. The address information g, i and k correspond to the time information ahead in time-wise from the search end position S according to the shuttle 27, out of the address information a, c, e, g, i and k, which have been read out from the memory 6 in S7. With one more click in clockwise on the jog 28, the microcomputer 8 holds as a new A point address information, the address information i, which is next to the address information g currently held, out of the address information g, i, k which correspond to the time information ahead of the search end position S according to the shuttle 27. As thus described, every one click on the jog 28 in clockwise, the microcomputer 8 traces only the downbeats one by one, in such a manner as g→i→k, in the direction ahead in time-wise from the start point, which is the search end position S according to the shuttle 27.

As shown in FIG. 4B, when the jog 28 is rotated in anticlockwise causing one click on the jog 28, the microcomputer 8 holds the address information e as the A point address information, which is the closest to the search end position S according to the shuttle 27, out of the address information a, c and e. The address information a, c and e correspond to the time information preceding the search end position S according to the shuttle 27, out of the address information a, c, e, g, i and k, which have been read out from the memory 6 in S7. With one more click in anticlockwise on the jog 28, the microcomputer 8 holds as a new A point address information, the address information c, which is next to the address information e currently held, out of the address information a, c, e which correspond to the time information preceding the search end position S according to the shuttle 27. As described above, every one click on the jog 28 in anticlockwise, the microcomputer 8 traces only the downbeats one by one, in such a manner as e→c→a, in the direction backward in time-wise from the start point, which is the search end position S according to the shuttle 27.

On the other hand, when the operation mode of the jog 28 is one-beat search mode, ever time when the user clicks the jog 28 once, by rotating the jog 28 in clockwise, it is possible to search for the beat, one by one, detected from the audio signals included in 15 seconds before the search end position according to the shuttle 27. Specifically, the microcomputer 8 executes the following beat searching processing.

As shown in FIG. 4A, when the jog 28 is rotated in clockwise causing one click, the microcomputer 8 holds the address information g as the A point address information, which is the closest to the search end position S according to the shuttle 27, out of the address information g, h, i, j and k. The address information g, h, i, j and k correspond to the time information ahead in time-wise from the search end position S according to the shuttle 27, out of the address information a, b, c, d, e, f, g, h, i, j and k, which have been read out from the memory 6 in S7. With one more click in clockwise on the jog 28, the microcomputer 8 holds as a new A point address information, the address information h, which is next to the address information g currently held, out of the address information g, h, i, j and k which correspond to the time information ahead of the search end position S according to the shuttle 27. As described above, every one click on the jog 28 in clockwise, the microcomputer 8 traces the beats not limited to the downbeat one by one, in such a manner as g→h→i→j→k, in the direction ahead in time-wise from the start point, which is the search end position S according to the shuttle 27.

As shown in FIG. 4A, when the jog 28 is rotated in anticlockwise causing one click on the jog 28, the microcomputer 8 holds the address information f as the A point address information, which is the closest to the search end position S according to the shuttle 27, out of the address information a, b, c, d, e and f. The address information a, b, c, d, e and f correspond to the time information preceding the search end position S according to the shuttle 27, out of the address information a, b, c, d, e, f, g, h, i, j and k, which have been read out from the memory 6 in S7. With one more click in anticlockwise on the jog 28, the microcomputer 8 holds as a new A point address information, the address information e, which is next to the address information f currently held, out of the address information a, b, c, d, e and f which correspond to the time information preceding the search end position by the shuttle 27. As described above, every one click in anticlockwise on the jog 28, the microcomputer 8 traces the beats not limited to downbeat one by one, in such a manner as f→e→d→c→b→a, in the direction backward in time-wise from the start point, which is the search end position S according to the shuttle 27.

According to thus described beat search processing or downbeat search processing, when the A point reaches a desired beat (that is, it is determined that fine adjustment is not necessary in S9), the user presses the A button (23 or 24) in S12. Then, the microcomputer 8 stores in the built-in memory, the address information of the A point currently held, as a fixed address information of the A point.

When it is determined that fine adjustment is necessary in S9, the user may press the JM1 button 31 in S10. Accordingly, the operation mode of the jog 28 becomes one-frame search mode. At this timing, the microcomputer 8 lights up only LED1, for example, out of the two LEDs (LED1, LED2) 29, 30.

Subsequently, the user can conduct a search for the audio signal in units of one frame, every one click on the jog 28, as indicated in the following step (i.e., in S11). Specifically, the microcomputer 8 executes the following frame search processing.

When the jog 28 is rotated in clockwise causing one click, the microcomputer 8 sets a start point on the A point defined in S8, and searches for the audio signal at the position one frame ahead in the time-wise direction from the start point. With one more click on the jog in clockwise, the microcomputer 8 searches for the audio signal at the position one more frame ahead in the time-wise direction. In this manner, every one click on the jog 28 in clockwise, the microcomputer 8 continues to searching for the audio signals, frame by frame, in the direction ahead in time-wise from the A point defined in S8. For example, in the case of music of 130 BPM and 4-beat rhythms, every one click on the jog 28, searching for the audio signals corresponding to 13.3 msec is conducted.

On the other hand, when the jog 28 is rotated in anticlockwise causing one click on the jog 28, the microcomputer sets a start point on the A point defined in S8 and searches for the audio signal at the position of one preceding frame from the start point in the time-wise direction. With one more click on the jog 28 in anticlockwise, the microcomputer 8 searches for the audio signal at the position of one more preceding frame in the time-wise direction. In this manner, every one click on the jog 28 in anticlockwise, the microcomputer 8 continues to tracing the audio signals, frame by frame, in the direction backward in time-wise from the A point defined in S8.

When the fine adjustment of the A point is completed with the frame search processing as described above, the user may press the A button (23 or 24) in S12, similar to the previous case. Accordingly, the microcomputer 8 stores in the built-in memory in the microcomputer 8, the address information of A point after the fine adjustment, as a fixed address information of the A point.

In the downbeat search mode, one-beat search mode, and the one-frame search mode, the sounds included in several frames before (for example, three frames before) the search position are read from the memory 6 and are reproduced repeatedly, so that the user can set the A point and the B point with confirming the search position by use of the sounds. The DSP 7 controls reading from the memory 6 the audio signal corresponding to the A point which has been set. Therefore, the optical disc reproducing apparatus relating to the present embodiment can perform reproducing from the A point thus defined.

As thus described, according to the optical disc reproducing apparatus of the present embodiment, every time when the user clicks the jog 28 once, searching for the beat can be performed, one by one, without fail. Furthermore, according to the optical disc reproducing apparatus of the present embodiment, in the case where downbeats of two music pieces are to be matched so as to continuously reproduce the music naturally and seamlessly, the user can search for only the downbeat one by one, every one click on the jog 28, just by changing the operation mode of the jog 28 without picking up the other beats such as upbeat or medium upbeat. That is, the user can more efficiently set the A point on the downbeat or the beat not limited to the downbeat, comparing to the conventional technique which includes only frame search mode, i.e., the beat is detected by searching for the audio signal in units of one frame or a plurality of frames, every time when one operation (one click, one rotation) on the jog 28 is conducted.

The effect as described above will be explained with an example that a music piece of 130 BPM and 4-beats rhythms is recorded on a CD-DA (1 frame: 13.3 msec).

Figure 5A:
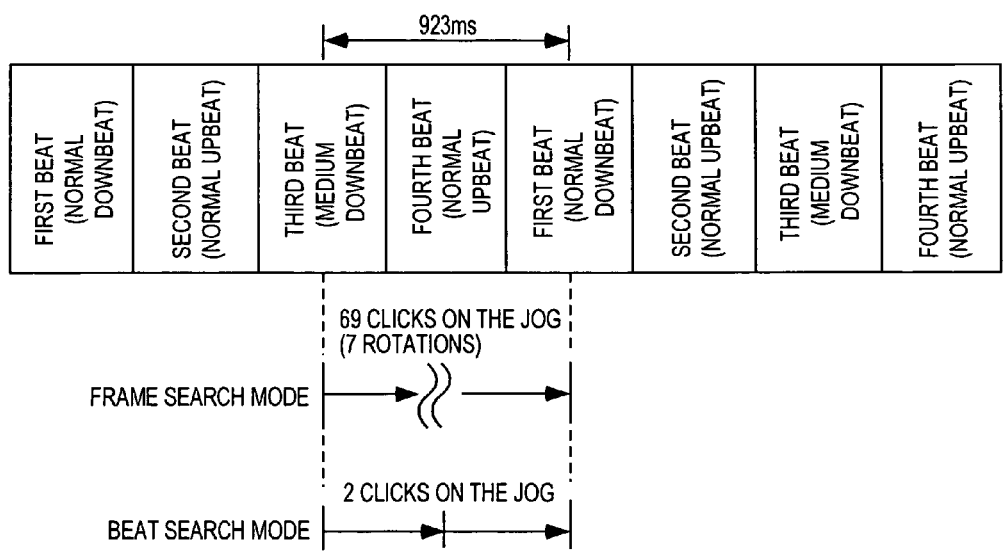
FIG. 5A and FIG. 5B are diagrams for explaining an operability of the optical reproducing apparatus relating to one embodiment of the present invention.

As shown in FIG. 5A, since the interval of two beats of the music piece of 130 BPM and 4-beats rhythms is 923 msec, a user is required to click the jog 28, 69 times, if searching is conducted in the frame search mode, for the two beats of the music piece. Even in the case where searching can be conducted for 10 frames with one rotation of the jog 28, the user is still required to make 7 rotations on the jog 28. To the contrary, if searching is conducted with the one beat search mode, the user is required to click the jog 28 only two times.

Figure 5B:
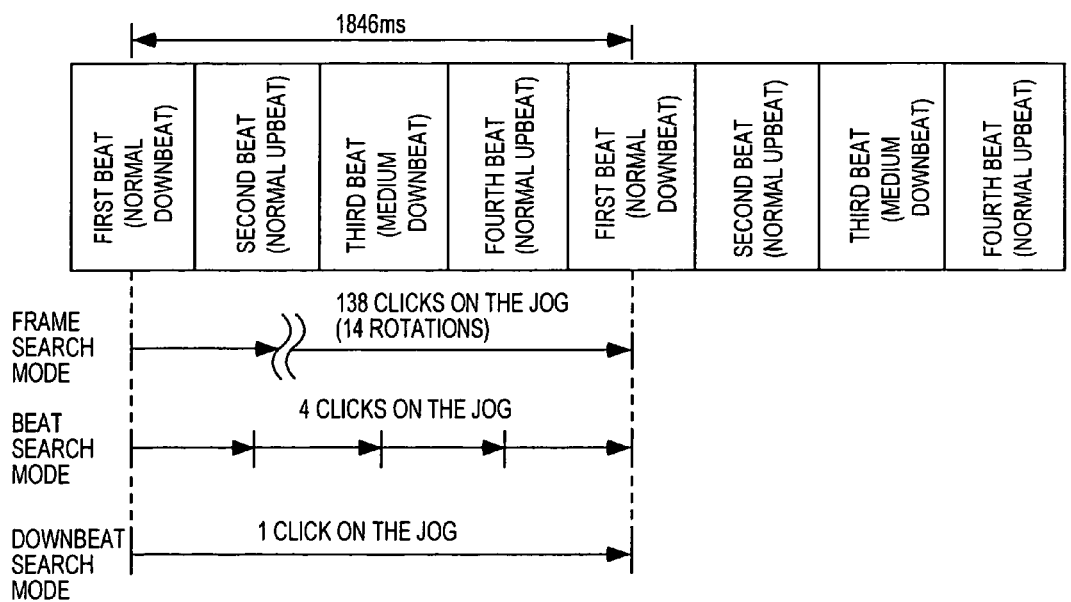

As shown in FIG. 5B, since the interval between the downbeats of the music piece of 130 BPM, 4-beat rhythms is 1,846 msec, a user is required to click the jog 28, 138 times, if searching is conducted in the frame search mode for the two beats of the music piece. Even in the case where searching can be conducted for 10 frames with one rotation of the jog 28, the user is still required to make 14 rotations on the jog 28. To the contrary, if searching is conducted with the one beat search mode, the user is required to click the job 28 four times, and with the downbeat search mode, the user is required only one click on the jog 28.

As thus described, according to the present invention, it is possible to enhance the operability of the optical disc reproducing apparatus, when searching for the beat is conducted.

In the above description, there has been explained the beat searching that is performed in setting the A point. However, even in setting the B point, beat searching can be performed in a similar manner of processing.

Further in the above description, if the audio signal from the optical disc 1 can be read at a high rate, such as the ration of 8, storing of the audio signal into the memory 6 and the beat detecting processing can be performed within a shorter period of time. Therefore, the time required for searching the beat, which becomes A point or B point, is further reduced, and the DJ is given a sufficient time to show his or her performance.

What is claimed is:

1. An optical disc reproducing apparatus comprising:
    a reproducing means which reproduces, from an optical disc, an audio signal and time information relating to a reproducing time for said audio signal, which are recorded on said optical disc;
    a beat detecting means which detects beats contained in a musical rhythm represented by said audio signal, from said audio signal reproduced by said reproducing means;
    a first storing means which stores said audio signal reproduced by said reproducing means;
    a second storing means which stores the time information reproduced by said reproducing means, with respect to each audio signal respectively corresponding to said beats being continuous, which are detected by said beat detecting means;
    a first operation means which receives a beat searching operation from a user; and
    a control means which, when said first operation means receives said beat searching operation from said user, searches for the time information of said beats being continuous stored in said second storing means, in order of time represented by the time information, or in reverse order thereof, and reads said audio signal stored in said first storing means based on the time information thus searched.

2. The optical disc reproducing apparatus, according to claim 1, further comprising:
    a second operation means which receives a mode designation for searching a beat by said control means, wherein,
    said beat detecting means classifies said beats according to a signal level of said audio signal corresponding to each of said beats, and
    if said second operation means receives a designation of downbeat search mode as said mode designation, upon receipt of said searching operation by said first operation means, said control means searches for the time information, in order of time represented by the time information, or in reverse order thereof, as to said beats having been classified as the downbeat by said beat detecting means, out of the time information stored in said second storing means.

3. The optical disk recording apparatus according to claim 2, further comprising a switching means which switches said operation mode of said first operation means to one of one-frame search mode or one-beat search mode.

4. An optical disc reproducing apparatus comprising:
a reproducing means which reproduces, from an optical disc, an audio signal and time information relating to a reproducing time for said audio signal, which are recorded on said optical disc;
a beat detecting means which detects beats contained in a musical rhythm represented by said audio signal from said audio signal reproduced by said reproducing means;
a first storing means which stores said audio signal reproduced by said reproducing means;
a second storing means which stores said time information reproduced by said reproducing means, with respect to each audio signal respectively corresponding to said beats being continuous, which are detected by said beat detecting means;
a first operation means which receives a beat searching operation from a user; and
a control means which, when said first operation means receives said beat searching operation from said user, reads the audio signal corresponding to said time information of beats stored in said second storing means, said audio signal being stored in said first storing means.

5. The optical disc reproducing apparatus according to claim 4, further comprising:
a second operation means which receives a mode designation for searching a beat by said control means, wherein:
said beat detecting means classifies said beats according to a signal level of said audio signal corresponding to each of said beats, and
if said second operation means receives a designation of downbeat search mode as said mode designation, upon receipt of said searching operation by said first operation means, said control means searches for said time information, in order of time represented by said time information, or in reverse order thereof, as to the beats having been classified as the downbeat by said beat detecting means, out the said time information stored in said second storing means.

6. The optical disc reproducing apparatus according to claim 5, further comprising a switching means which switches the operation mode of said first operation means to one of one-frame search mode and one-beat search mode.

* * * * *